April 15, 1958 I. D. COLSON ET AL 2,830,920

MANUFACTURE OF SEMI-CONDUCTOR DEVICES

Filed Dec. 19, 1955 4 Sheets-Sheet 1

INVENTORS
IAN DOUGLAS COLSON
RALPH DAVID KNOTT
MICHAEL RUPERT PLATTEN YOUNG
BY
ATTORNEY

INVENTORS
IAN DOUGLAS COLSON
RALPH DAVID KNOTT
MICHAEL RUPERT PLATTEN YOUNG
BY [signature]
ATTORNEY April 15, 1958 I. D. COLSON ET AL 2,830,920

MANUFACTURE OF SEMI-CONDUCTOR DEVICES

Filed Dec. 19, 1955 4 Sheets-Sheet 3

INVENTORS
IAN DOUGLAS COLSON
RALPH DAVID KNOTT
MICHAEL RUPERT PLATTEN YOUNG

BY
[signature]
ATTORNEY

INVENTORS
IAN DOUGLAS COLSON
RALPH DAVID KNOTT
MICHAEL RUPERT PLATTEN YOUNG
BY
[signature]
ATTORNEY

United States Patent Office 2,830,920

Patented Apr. 15, 1958

2,830,920

MANUFACTURE OF SEMI-CONDUCTOR DEVICES

Ian Douglas Colson, Whitstable, Ralph David Knott, North Greenford, and Michael Rupert Platten Young, Wembley, England, assignors to The General Electric Company Limited, London, England Application December 19, 1955, Serial No. 554,010

Claims priority, application Great Britain December 23, 1954

7 Claims. (Cl. 148—1.5)

This invention relates to the manufacture of semiconductor devices.

The invention is concerned in particular with methods of manufacturing semiconductor devices of the kind in which an electrode of the device is formed by fusing on the surface of a semiconductor body a material incorporating at least one substance capable of acting in the semiconductor as a significant impurity (that is to say a donor or acceptor impurity), the molten material dissolving part of the semiconductor body, and then cooling the material so that a layer of the semiconductor containing said substance is redeposited from the molten material contiguous with the remainder of the semiconductor body.

In semiconductor devices manufactured by such a method it has been found hitherto that the boundary between the redeposited layer and the remainder of the semiconductor body is often irregular, so that poor characteristics are obtained, and it is difficult to achieve uniformity of characteristics over a group of similar devices.

It is therefore an object of the present invention to provide a method of the kind specified, by means of which greater regularity of the boundary between the redeposited layer and the remainder of the semiconductor body may be obtained.

According to the present invention, a method of manufacturing a semiconductor device of the kind specified includes the step, prior to the formation of the electrode, of causing the material which is to be fused to adhere to the semiconductor body, over at least a major part of the area on which the electrode is to be formed, by pressing together freshly formed surfaces on said material and said body.

By a freshly formed surface is meant a surface which since it was formed has been maintained in conditions such that its nature is substantially unaltered. This will normally imply that the surface is maintained in ordinary air for only a short time, or is maintained in a suitable inert atmosphere.

The improved results obtained by use of the invention are believed to be explicable in terms of the substantially complete exclusion of foreign matter between the semiconductor and the material which is to form the electrode before this material is fused, and the resultant thorough wetting of the surface of the semiconductor by the molten material when fusion takes place.

Two methods in accordance with the invention will now be described by way of example with reference to the accompanying drawings, in which.

Figure 1:
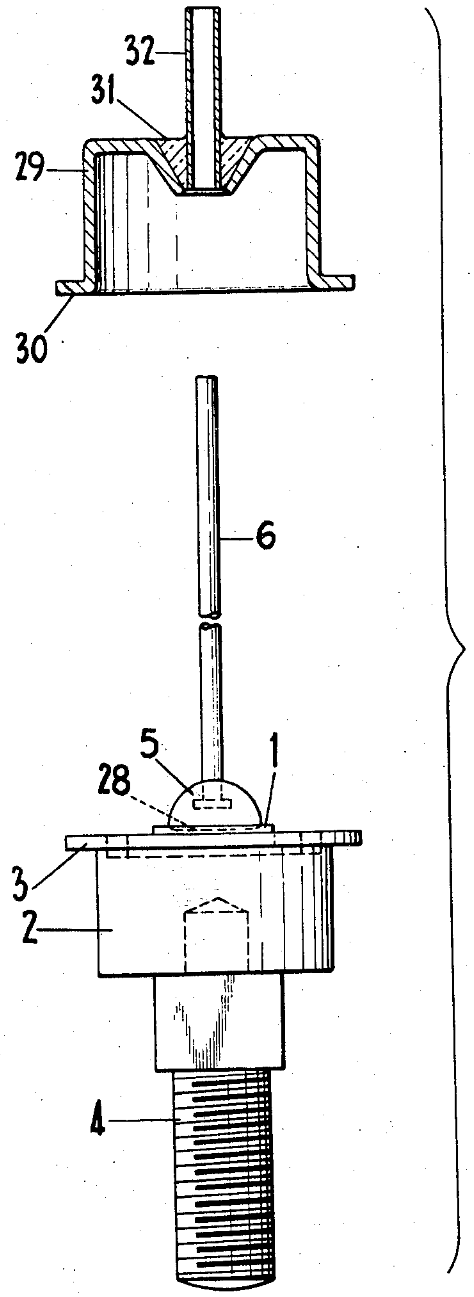
Figure 1 is an elevation, partly in section, of parts of a P–N junction rectifier just before the final assembly of the rectifier.

Referring to Figure 1 of the drawings, the rectifier is manufactured from a plate 1 of N-type germanium having a resistivity of about 10 ohm centimetres, the plate 1 having a thickness of about 0.4 millimetre and having main faces about six millimetres square. One main face of the plate 1 is soldered to a cylindrical copper block 2 which is provided with a peripheral flange 3, a threaded fixing stud 4 being soldered to the other end of the block 2. The other main face of the plate 1 is provided with an electrode 5 in the form of a bead of indium, in which is embedded the end of a nickel lead wire 6.

Before the formation of the electrode 5, the material from which it is to be formed is prepared as follows. A quantity of about 100 milligrams of pure indium is placed in a stainless steel die and is moulded by pressure from a punch into the shape of a truncated cone having an axial cylindrical hole extending partially through it from the smaller plane face of the cone; the truncated cone has plane faces of diameters 3.5 and 4 millimetres respectively and has a height of 2.4 millimetres, the axial hole having a diameter of 1.85 millimetres and a length of 1.5 millimetres.

Figure 2:
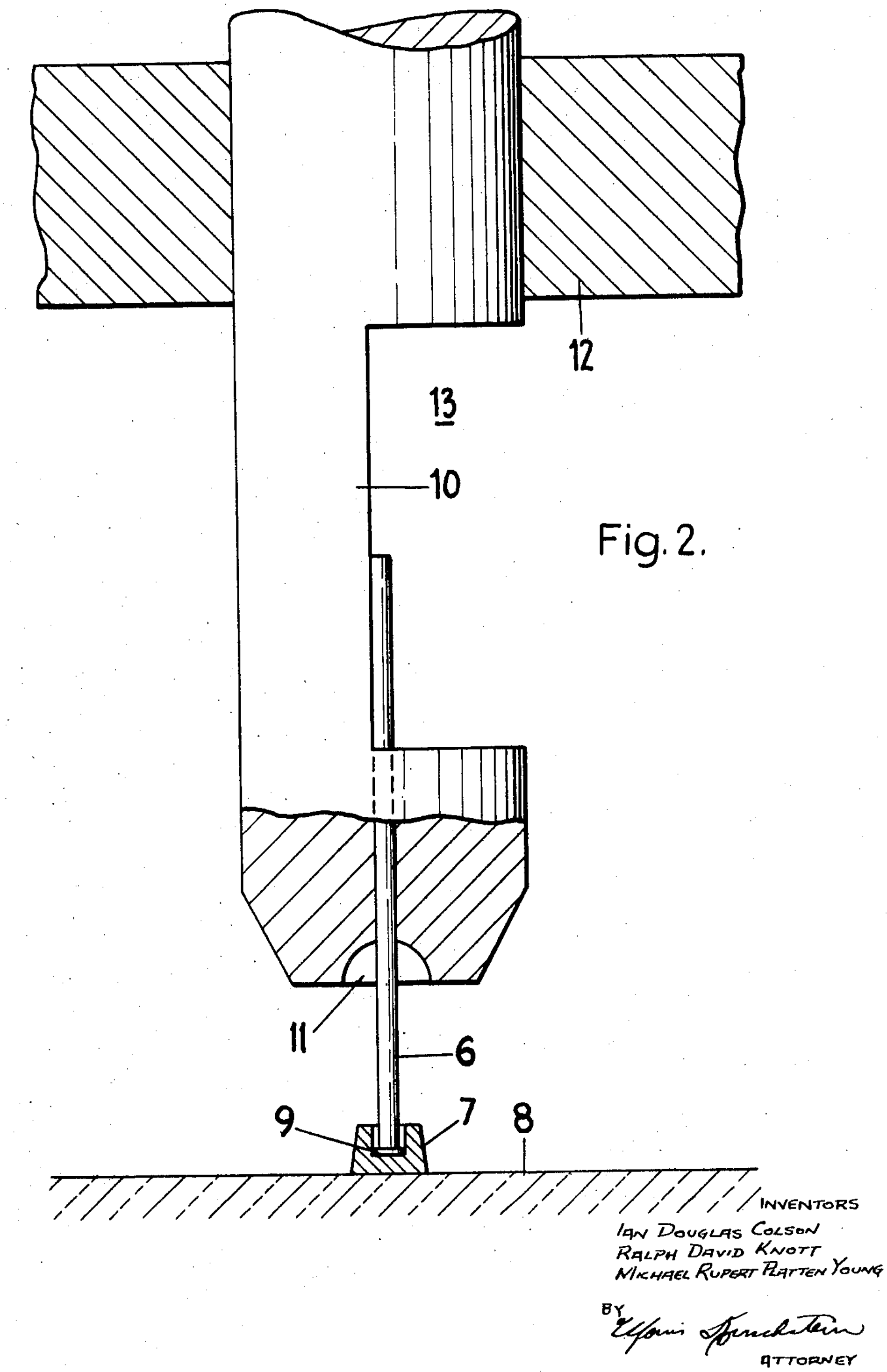
Figure 2 illustrates a stage in the manufacture of the rectifier shown in Figure 1.

Referring now to Figure 2 of the drawings, the indium cone 7 is placed on a plate glass die plate 8 and the end of the nickel lead wire 6 is inserted in the hole in the cone 7, the wire 6 having a diameter of 1 millimetre and being provided at this end with a flange 9 having an external diameter of 1.75 millimetres and a thickness of 0.25 millimetre. The wire 6 is of commercially pure nickel and is initially thoroughly cleaned by furnacing at first in dry hydrogen for ten minutes at a temperature of 1000° C. and then in vacuo for ten minutes at the same temperature. The wire 6 is also threaded through an axial hole in a vertically extending stainless steel punch 10, which has a plane end surface in which is formed a central hemispherical cavity 11 of diameter 4.5 millimetres. The punch 10 slides in a hole in a horizontal supporting bar 12, and after the cone 7 and wire 6 have been placed in position the punch 10 is subjected to a downward impulse to mould the indium cone 7 into the form of a hemisphere around the end of the wire 6. The flange 9 ensures that the wire 6 is firmly embedded in the indium hemisphere thus produced, while the initial shape of the cone 7 is chosen so that the flow of indium during the moulding operation is such that there is no tendency for the wire 6 to rise or for air to be trapped around the wire 6. In order to enable the wire 6 and the moulded indium hemisphere to be removed from the punch 10 without handling the indium hemisphere, the punch 10 is cut away at 13 so that the wire 6 may be pushed out from the end remote from the indium hemisphere.

The volume of indium in the cone 7 is slightly greater than that required to fill the cavity 11, so that when the indium hemisphere is first formed there is an excess of indium present at its base. Immediately before the indium hemisphere is required for the next stage of the manufacture of the rectifier, which consists in causing the indium hemisphere to adhere to the germanium plate 1, the indium hemisphere and the lead wire 6 are reinserted in the punch 10 and the excess of indium is carefully cut off the base of the indium hemisphere with a sharp blade to form a fresh planar surface of accurately circular periphery. A short time before the indium hemisphere is caused to adhere to the germanium plate 1, one main face of the plate 1 is provided with a fresh surface by etching with a reagent consisting of 3 volumes of glacial acetic acid, 5 volumes of concentrated nitric acid, and 3 volumes of hydrofluoric acid, together with about 0.3% of bromine; the opposite main face of the plate 1 is masked during the etching process.

Figure 3:
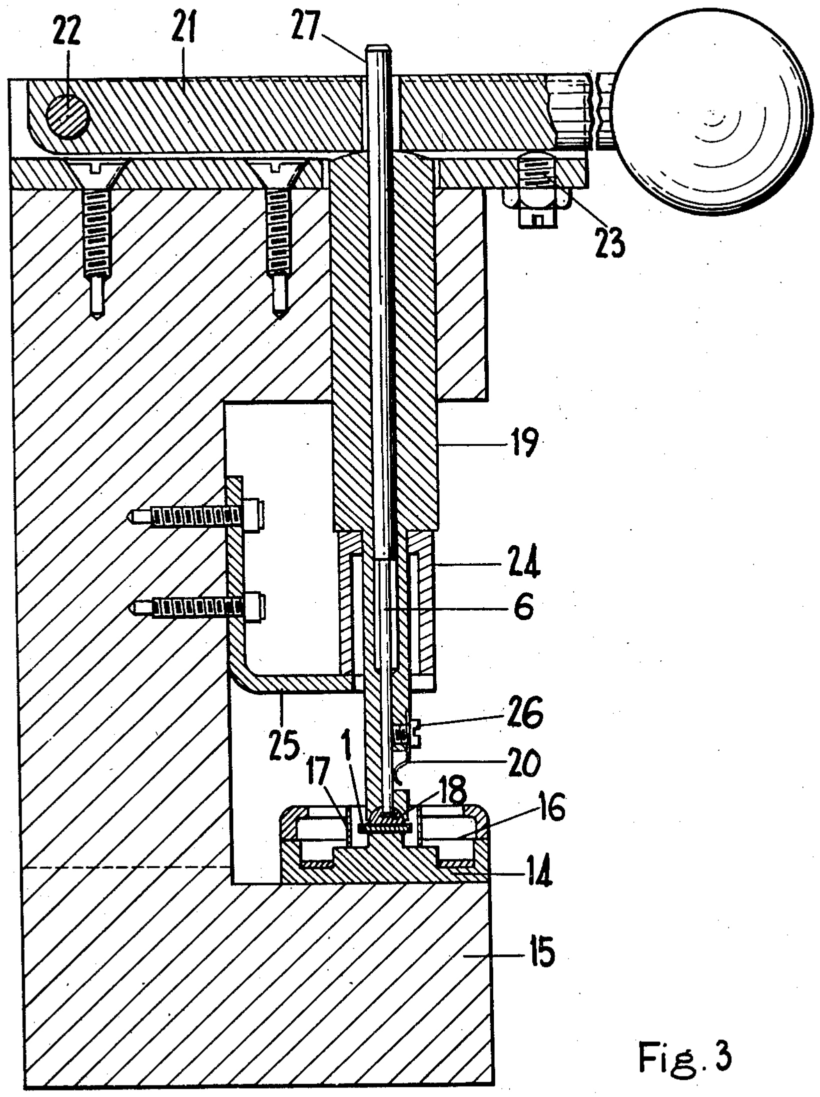
Figure 3 illustrates a subsequent stage in the manufacture of the rectifier shown in Figure 1.

Referring now to Figure 3, the plate 1 is placed on a die block 14 which is mounted on a frame 15, the freshly etched main face of the plate 1 being disposed uppermost, and the plate 1 being held central on the die block 14 by means of an iris diaphragm 16 which bears on a cylinder 17 of thin spring steel, the cylinder 17 in turn bearing on the corners of the plate 1. The lead wire 6 and indium hemisphere 18 are inserted in a punch 19 in which they are held by means of a spring 20, the wire 6 passing through an axial hole in the punch 19 and the hemisphere 18 fitting into a part spherical cavity formed in the end of the punch 19 and having a radius equal to that of the hemisphere 18; the punch 19 is a sliding fit in a vertically extending hole formed in the frame 15. The freshly cut surface at the base of the hemisphere 18 is caused to adhere to the freshly etched main face of the plate 1 by pressing these two surfaces together; this is brought about by applying manual pressure to the free end of a lever 21 which is pivoted at 22 and bears on the upper end of the punch 19, the downward motion of the lever 21 being limited by means of a stop 23. The assembly formed by the germanium plate 1, the indium hemisphere 18, and the lead wire 6 is then removed from the punch 19 in the following manner. The lever 21 is first raised to a substantially vertical position, and the punch 19 is then slid vertically upwards through the hole in the frame 15. As the punch 19 is raised, its lower portion passes through a cylindrical shield 24, which is a loose fit around this portion of the punch 19 and is prevented from falling by means of a bracket 25 secured to the frame 15, until the head of the bolt 26 which secures the spring 20 abuts on the closed end of the shield 24, and the shield 24 is then carried upwards with the punch 19 in a position such that the germanium plate 1 is sheathed and thereby protected from damage during the passage of the punch 19 through the hole in the frame 15. The assembly is finally removed from the punch 19 by pushing an ejector rod 27 through an axial hole in the punch 19 until sufficient of the wire 6 emerges to be grasped.

The soldering of the germanium plate 1 to the copper block 2 and the formation of the electrode 5 are then carried out as follows. The copper block 2 is mounted in a jig (not shown) with the end to which the germanium plate 1 is to be soldered disposed uppermost; on this end of the copper block 2 is laid a thin disc of soft solder (not shown) and the nickel wire 6 is held by the jig so that the lower main face of the germanium plate 1 rests on the upper face of the disc of solder. The whole assembly is heated to a temperature of about 550° C. in an atmosphere of dry hydrogen, and is then allowed to cool. By this means the lower face of the germanium plate 1 is soldered to the copper block 2, while the indium hemisphere 18 is fused to the upper face of the germanium plate 1 so as to form a bead 5 at the base of which is a P–N junction 28 separating the main body of N-type germanium from a layer of P-type germanium formed by recrystallisation from the indium-germanium alloy produced during the heating. The wire 6 is held sufficiently tightly in the jig to prevent it sinking through the molten indium during the heating operation and thereby coming into contact with the germanium. The thorough initial cleaning of the wire 6 and the method of moulding the indium hemisphere 18 described above minimise difficulties which might arise due to the evolution of gas bubbles in the molten material during the heating; furthermore, the use of a hemispherical shape for the indium moulded around the end of the wire 6, which corresponds to the equilibrium molten shape of the bead 5, minimises difficulties which might arise due to flowing out or contraction of the material on melting. In order to ensure consistently good results in the formation of the P–N junction 28, it has been found desirable when using an indium bead of the dimensions described above that the spacing between the end of the wire 6 and the original main face of the germanium plate 1 should not be much less than one millimetre.

Referring again to Figure 1 of the drawings, the envelope of the rectifier is then completed by disposing over the end of the copper block 2 a copper cap 29 having a peripheral flange 30, the cap 29 having sealed through it a glass bead 31 through which is sealed a nickel tube 32 through which the lead wire 6 passes. The envelope is sealed by cold pressure welding the flanges 3 and 30 together, and then cold pressure welding the tube 32 to the wire 6, the cold welding operations being carried out in an inert atmosphere such as nitrogen so as to provide a permanent inert gas filling for the envelope of the completed rectifier.

As stated above, the germanium plate 1 is etched a short time before the indium and germanium are caused to adhere to each other, while a fresh surface is cut on the indium hemisphere 18 immediately before this operation. If the surfaces are maintained in ordinary air, we have found it necessary in order to obtain satisfactory results that the surfaces should be caused to adhere together within about an hour of the etching and within one or two minutes of the cutting of the fresh surface on the indium. It has been found that the pressure which must be applied to achieve satisfactory adhesion between the indium hemisphere 18 and the germanium plate 1 depends to some extent on the manner in which the indium has been initially prepared. It may be desirable in some cases that the indium should be prepared in such a way that satisfactory adhesion can be brought about with the lowest possible pressure, for example where there is a risk that the germanium plate 1 might crack during the operation in which the adhesion is brought about. In such cases we have found that a suitable method of preparing the indium is to heat molten indium in a vacuum at a temperature of about 600° C. for half an hour in an alumina crucible, to cast the molten indium under vacuum in a stainless steel mould, and to produce a rod of indium by extrusion from the ingot thus formed.

If desired, the assembly of the germanium plate 1, the indium hemisphere 18 and the wire 6 formed in the manner described above may be stored in a suitable atmosphere for an extended period without deterioration, before the formation of the electrode 5 is carried out. For example, such assemblies have been stored in sealed air filled containers with anhydrous magnesium perchlorate for a month without deterioration.

It has been found that rectifiers produced in accordance with the method described above are generally improved in respect to the consistency of their characteristics, their ability to withstand high voltages in the reverse direction, and the magnitude of their resistances in the reverse direction. A further advantage of the method resides in the fact that it eliminates the necessity of etching the germanium after the electrode 5 is formed in order to obtain a satisfactory characteristic for the P–N junction in the reverse direction.

Figure 4:
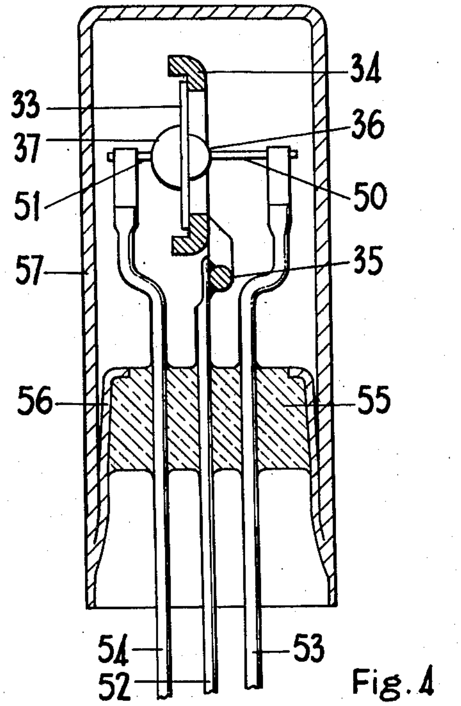
Figure 4 is a sectional view of a P–N–P junction transistor.

Referring now to Figure 4, in the second method the transistor is manufactured from a plate 33 of N-type germanium having a resistivity of about two ohm centimetres, the plate 33 having a thickness of about 0.15 millimetre and having main faces about three millimetres square. One main face of the plate 33 is soldered to a nickel plate 34 which has formed in it a circular aperture and to which is welded a nickel lead wire 35, the plate 34 constituting the base electrode of the transistor. Centrally disposed on opposite main faces of the germanium plate 33 are emitter and collector electrodes 36 and 37 respectively which are in the form of beads of indium, the electrode 36 being of smaller diameter than the electrode 37 and being disposed on the main face of the plate 33 which is soldered to the nickel plate 34.

Figure 5:
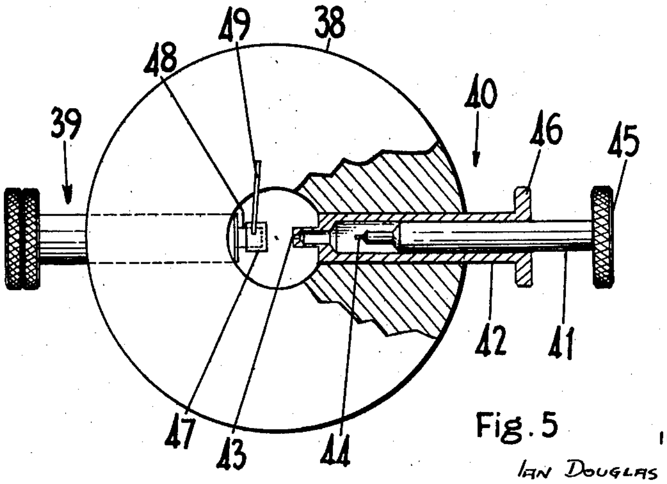
Figure 5 is a plan, partly in section, of a jig used in the manufacture of the transistor shown in Figure 4.

During the manufacture of the transistor, the indium from which the electrodes 36 and 37 are to be formed is caused to adhere to the germanium plate 33 prior to the formation of the electrodes 36 and 37. For this purpose there is used a jig which is illustrated in Figure 5. The jig includes an annular stainless steel block 38 which has formed in it two coaxial holes of circular cross-section which extend diametrically across the block 38; the holes accommodate two punches 39 and 40, corresponding respectively to the emitter and collector electrodes 36 and 37. The collector punch 40 is shown in detail in the drawing, and consists of inner and outer cylindrical stainless steel members 41 and 42 respectively, the former of which slides inside the latter. In one end of the member 42 is formed a small central hole 43 having a diameter of 1.15 millimetres, the hole 43 communicating with the main cavity inside the member 42 in which the member 41 slides. The member 41 is provided at the corresponding end with a central spigot 44 which mates with the hole 43. The members 41 and 42 are respectively provided at their other ends with flanges 45 and 46, the lengths of the members 41 and 42 being such that when the flanges 45 and 46 are pressed firmly together the end of the spigot 44 is flush with the end of the member 42. The emitter punch 39 is generally similar to the collector punch 40, but in this case the diameter of the small hole in the end of the outer member is 0.57 millimetre. The jig also includes a support for the germanium plate 33, which consists of a short tubular member 47 arranged to fit over a boss 48 formed on the outer member of the emitter punch 39, and having formed at one end a square recess in which the germanium plate 33 can be accommodated with its main faces perpendicular to the axis of the member 47. A wire 49 is soldered to the member 47 for convenience in handling the member 47.

The jig is used in the following manner. The germanium plate 33, whose main faces have been provided with fresh surfaces a short time previously by etching with the reagent referred to above, is placed in the support member 47 mounted on the boss 48, the inner member of the emitter punch 39 being removed at this stage. The collector punch 40 is removed from the block 38, and the spigot 44 is retracted a distance of 0.46 millimetre inside the hole 43 by inserting a feeler gauge having this thickness between the flanges 45 and 46. A one millimetre length of indium wire having a diameter of 1.06 millimetres is inserted into the hole 43, and the punch 40 is then pressed against a ground glass plate so that the indium is squashed firmly into the hole 43, leaving an excess of indium present at one end of the indium cylinder thus formed. This excess of indium is cut off with a sharp blade so as to form a fresh surface, the member 41 is advanced a distance of 0.05 millimeter in the member 42 so that the indium cylinder protrudes slightly from the hole 43, and the punch 40 is immediately reinserted in the block 38 and advanced so as to press the fresh surface on the indium cylinder into contact with one main face of the germanium plate 33, the punch 40 being rotated through an angle of about 90° about its axis while the pressure is applied. By this means the surface of the indium cylinder is caused to adhere firmly to the main face of the germanium plate 33.

The emitter punch 39 and the support member 47 are then withdrawn, leaving the germanium plate 33 suspended in position by virtue of its adhesion to the indium cylinder disposed in the hole 43. With the germanium plate 33 in this position, a second indium cylinder is caused to adhere to its second main face by using the emitter punch 39 in a similar manner to that described above, a one millimetre length of indium wire of diameter 0.5 millimetre being used in this case to produce the indium cylinder. The flanges on the inner and outer members of the emitter punch 39 are then pressed firmly together to extrude the indium cylinder from the punch 39 and this punch is then withdrawn. Finally the flanges 45 and 46 are pressed firmly together to extrude the first indium cylinder from the hole 43, this cylinder being parted off from the end of the member 42 by means of a sharp blade.

The formation of the bead electrodes 36 and 37 and the provision of a base connection for the transistor are then carried out as follows. The germanium plate 33, with the indium cylinders attached, is placed in a jig (not shown) together with the nickel plate 34, which has initially been tinned, the plates 33 and 34 being held together in the desired spatial relationship. The whole assembly is heated to a temperature of about 550° C. in an atmosphere of dry hydrogen and is then allowed to cool. By this means the germanium plate 33 is soldered to the nickel plate 34, and each indium cylinder is fused to the appropriate main face of the germanium plate 33 so as to form a bead 36 or 37 at the base of which is a P–N junction (not shown) separating the main body of N-type germanium from a layer of P-type germanium formed by recrystallisation from the indium-germanium alloy produced during the heating. The final diameters of the formed beads 36 and 37 are approximately 0.75 millimetre for the bead 36 and 1.4 millimetres for the bead 37.

Referring again to Figure 4, the assembly thus formed is removed from the jig and the transistor is provided with a further pair of leads constituted by two fine wires 50 and 51 secured respectively to the indium beads 36 and 37. The wires 35, 50 and 51 are respectively welded to support wires 52, 53 and 54, which are sealed through a glass bead 55 which is itself sealed inside a copper skirt 56. The envelope of the transistor is completed by a copper cap 57 which is cold pressure welded at its rim to the skirt 56, the welding operation being carried out in an inert atmosphere such as nitrogen so as to provide a permanent inert gas filling for the envelope of the completed transistor.

It will be appreciated that the same considerations apply with regard to the times at which the germanium is etched and the indium is cut as are referred to above in the case of the rectifier. Similar considerations to those referred to in connection with the rectifier also apply with regard to the method of preparation of the indium, and the storage of the assemblies comprising the germanium plate 33 and the two indium cylinders.

It has been found that transistors manufactured by the method described above are generally improved in respect of the consistency of their characteristics and their ability to withstand high voltages. Furthermore, the fact that the method results in an improvement in the uniformity of the geometry of the P–N junctions, and particularly in the depth of penetration of the P–N junctions below the original surface of the germanium, makes it possible to utilise smaller thicknesses for the base region between the junctions without the risk of interpenetration of the junctions, thus leading to improved high frequency performance; this fact also implies that the prediction of the characteristics of the transistor on a theoretical basis is more reliable, thus leading to a simplification of design procedure.

It will be appreciated that the invention is applicable to semiconductor devices utilising combinations of materials other than germanium and indium, subject to the limitation that freshly formed surfaces on the respective materials should adhere when pressed together; for example, we have found methods in accordance with the invention equally useful where an electrode is to be formed on germanium using indium containing a small percentage of antimony. In some cases it may be necessary to heat the materials during the pressing operation in order to achieve satisfactory adhesion. It will further be appreciated that, while the specific examples described above relate to semiconductor devices having electrodes at the base of which P–N junctions are formed, the invention is equally applicable in connection with electrodes at the base of which there is formed a P- or N-type layer in contact with a region of the semiconductor which is either intrinsic or of the same conductivity type as the layer.

We claim:

1. In a method of manufacturing a semiconductor device in which an electrode of the device is formed by fusing on the surface of a semiconductor body a metallic material incorporating at least one substance capable of acting in the semiconductor as a significant impurity, the molten material dissolving part of the semiconductor body, and then cooling the material so that a layer of the semiconductor containing said substance is redeposited from the molten material contiguous with the remainder of the semiconductor body: that improvement consisting of the step, prior to the formation of the electrode, of causing the material which is to be fused to adhere to the semiconductor body, over at least a major part of the area on which the electrode is to be formed, by pressing together freshly formed surfaces on said material and said body.

2. A method according to claim 1, in which at least a major part of said material is indium.

3. A method according to claim 2, in which the semiconductor is germanium.

4. A method according to claim 1, in which the fresh surface is formed on said material by cutting.

5. A method according to claim 1, in which the fresh surface is formed on the semiconductor by etching.

6. A method according to claim 1, in which said material is moulded in the form of a hemisphere, the plane surface on the hemisphere being caused to adhere to a plane surface on the semiconductor body.

7. A method according to claim 1, in which the material is moulded in the form of a right circular cylinder having a length less than its diameter, one end of the cylinder being caused to adhere to a plane surface on the semiconductor body.

References Cited in the file of this patent

UNITED STATES PATENTS

| | | |
|---|---|---|
| 2,697,269 | Fuller | Dec. 21, 1954 |
| 2,731,704 | Spanos | Jan. 24, 1956 |